(12) United States Patent
Dikovsky et al.

(10) Patent No.: US 10,675,789 B2
(45) Date of Patent: Jun. 9, 2020

(54) POLYMER BASED MOLDS AND METHODS OF MANUFACTURING THEREOF

(71) Applicant: STRATASYS LTD., Rehovot (IL)

(72) Inventors: Daniel Dikovsky, Rehovot (IL); Ido Eylon, Kfar Saba (IL)

(73) Assignee: STRATASYS LTD., Rehovot (IL)

( * ) Notice: Subject to any disclaimer, the term of this patent is extended or adjusted under 35 U.S.C. 154(b) by 0 days.

(21) Appl. No.: 16/004,396

(22) Filed: Jun. 10, 2018

(65) Prior Publication Data

US 2018/0290342 A1 Oct. 11, 2018

Related U.S. Application Data

(60) Continuation of application No. 15/867,755, filed on Jan. 11, 2018, now Pat. No. 10,029,395, which is a
(Continued)

(51) Int. Cl.
*B29C 33/40* (2006.01)
*B29C 33/56* (2006.01)
(Continued)

(52) U.S. Cl.
CPC ............. *B29C 33/40* (2013.01); *B29C 33/38* (2013.01); *B29C 33/56* (2013.01); *B29C 45/26* (2013.01);
(Continued)

(58) Field of Classification Search
CPC ......... B29C 33/40; B29C 45/26; B29C 33/38; B29C 33/56; B29C 64/112; B29C 33/3842; B29C 33/3828; B33Y 80/00; B33Y 30/00; B33Y 50/00; B29L 2031/757; B29K 2995/0017; B29K 2995/0012

See application file for complete search history.

(56) References Cited

U.S. PATENT DOCUMENTS 4,126,291 A * 11/1978 Gilbert .................... B29C 45/26
249/135
5,260,014 A 11/1993 Holton et al.
(Continued)

FOREIGN PATENT DOCUMENTS

CN 1488481 A 4/2004
CN 202480324 U 10/2012
(Continued)

OTHER PUBLICATIONS

International Search Report for International Application No. PCT/IL2014/050279 dated Dec. 22, 2014.
(Continued)

*Primary Examiner* — Nahida Sultana
(74) *Attorney, Agent, or Firm* — Pearl Cohen Zedek Latzer Baratz LLP

(57) ABSTRACT

Polymer-based molds are described. The polymer-based mold includes a first portion comprising a first material having a glass transition temperature (Tg) lower than about 80° C.; and a second portion comprising a second material having a Tg higher than about 80° C., wherein the second portion at least partially covers the first portion, the second portion is thinner than the first portion and faces a cavity in the polymeric mold.

18 Claims, 6 Drawing Sheets

Related U.S. Application Data division of application No. 14/774,355, filed as application No. PCT/IL2014/050279 on Mar. 13, 2014, now Pat. No. 9,868,230.

(60) Provisional application No. 61/781,697, filed on Mar. 14, 2013.

(51) Int. Cl.

| | | |
|---|---|---|
| *B29C 33/38* | (2006.01) | |
| *B33Y 80/00* | (2015.01) | |
| *B29C 45/26* | (2006.01) | |
| *B29C 64/112* | (2017.01) | |
| *B33Y 30/00* | (2015.01) | |
| *B33Y 50/00* | (2015.01) | |
| *B29L 31/00* | (2006.01) | |

(52) U.S. Cl.
CPC .......... *B33Y 80/00* (2014.12); *B29C 33/3828* (2013.01); *B29C 33/3842* (2013.01); *B29C 64/112* (2017.08); *B29K 2995/0012* (2013.01); *B29K 2995/0017* (2013.01); *B29L 2031/757* (2013.01); *B33Y 30/00* (2014.12); *B33Y 50/00* (2014.12)

(56) References Cited

U.S. PATENT DOCUMENTS

| | | | | |
|---|---|---|---|---|
| 5,439,622 A * | 8/1995 | Pennisi | ............ | B29C 33/38 264/401 |
| 5,641,448 A * | 6/1997 | Yeung | ............ | B29C 33/3842 264/401 |
| 5,807,519 A * | 9/1998 | Suzuki | ............ | B29C 33/3842 264/401 |
| 5,874,041 A | 2/1999 | Matsumura et al. | | |
| 5,952,018 A * | 9/1999 | Beldue | ............ | B29C 33/3842 425/556 |
| 6,001,298 A * | 12/1999 | McAloon | ............ | B29C 33/3842 264/401 |
| 6,203,731 B1 | 3/2001 | Kato | | |
| 8,050,786 B2 | 11/2011 | Holzwarth | | |
| 8,245,378 B2 * | 8/2012 | Dean | ............ | B29C 33/306 29/428 |
| 8,561,668 B2 * | 10/2013 | Castle | ............ | B29C 33/3807 164/4.1 |
| 8,765,045 B2 | 7/2014 | Zinniel | | |
| 9,475,233 B2 * | 10/2016 | Schmehl | ............ | B33Y 30/00 |
| 9,492,968 B2 * | 11/2016 | Wang | ............ | B22F 3/1055 |
| 9,695,345 B2 | 7/2017 | Yoo | | |
| 2004/0156945 A1 * | 8/2004 | Yoon | ............ | B29C 33/56 425/575 |
| 2005/0046042 A1 | 3/2005 | Matsumura | | |
| 2006/0001190 A1 * | 1/2006 | Priedeman, Jr. | ...... | B29C 64/106 264/219 |
| 2007/0231575 A1 * | 10/2007 | Watanabe | ............ | B29C 45/561 428/411.1 |
| 2009/0117453 A1 | 5/2009 | Kikuchi | | |
| 2010/0098742 A1 * | 4/2010 | Vacanti | ............ | A61L 27/3604 424/424 |
| 2010/0213642 A1 * | 8/2010 | Ootera | ............ | B29C 33/3857 264/447 |
| 2010/0227019 A1 * | 9/2010 | Kaushal | ............ | B29C 45/278 425/569 |
| 2010/0279468 A1 | 11/2010 | Ootake | | |
| 2010/0291379 A1 * | 11/2010 | Jo | ............ | C09D 5/08 428/336 |
| 2011/0217501 A1 | 9/2011 | Shishido | | |
| 2011/0280650 A1 * | 11/2011 | Schmitt | ............ | B29C 66/80 403/270 |
| 2012/0013038 A1 | 1/2012 | Stege | | |
| 2012/0043297 A1 * | 2/2012 | Fujii | ............ | B29C 33/38 216/11 |
| 2012/0258250 A1 | 10/2012 | Rodgers | | |
| 2013/0221583 A1 * | 8/2013 | Crassous | ............ | B29C 33/3814 264/571 |
| 2014/0106105 A1 * | 4/2014 | Albrecht | ............ | B29C 33/3857 428/36.92 |
| 2014/0346692 A1 * | 11/2014 | Watanabe | ............ | B29C 45/14 264/1.7 |
| 2016/0341234 A1 | 11/2016 | Germann | | |
| 2017/0186658 A1 * | 6/2017 | Ramalingam | ......... | H01L 23/295 |

FOREIGN PATENT DOCUMENTS

| | | |
|---|---|---|
| EP | 0950502 | 10/1999 |
| JP | H08174561 A | 7/1996 |
| JP | H09-174563 | 8/1997 |
| JP | H09-316113 | 9/1997 |
| JP | H10 138252 A | 5/1998 |
| JP | H11-300838 | 2/1999 |
| JP | 2001-079855 | 3/2001 |
| JP | 2008302591 | 12/2008 |
| JP | 2012-111226 | 6/2012 |

OTHER PUBLICATIONS

Notice of Allowance dated Jul. 30, 2019 for corresponding Japanese Application No. 2018-104362.
Office action of corresponding CN Application No. 2018107755388, dated Mar. 24, 2020.
Chinese article dated Apr. 30, 2007, 113, pp. 1-23.

* cited by examiner

POLYMER BASED MOLDS AND METHODS OF MANUFACTURING THEREOF

CROSS REFERENCE TO RELATED APPLICATIONS

This application is a Continuation of U.S. application Ser. No. 15/867,755, filed Jan. 11, 2018, which is a Divisional Application of U.S. patent application Ser. No. 14/774,355, filed Sep. 10, 2015, issued as U.S. Pat. No. 9,868,230. Patent application Ser. No. 14/774,355 is a National Phase Application of PCT International Application No. PCT/IL2014/050279, International Filing Date Mar. 13, 2014, claiming the benefit of U.S. Provisional Patent Application No. 61/781,697, filed Mar. 14, 2013, which are all hereby incorporated by reference in their entirety

BACKGROUND

Injection molding processes involve the injection of softened or liquidized material into a mold having a cavity designed as invert geometry to the geometry of the desired final product. The injected material is solidified in the mold either via a physical process, e.g. thermal phase transition or via a chemical process, e.g. cross-linking or condensation polymerization. Injection molding processes are accompanied by elevated temperatures and high stresses, which are required for rapid and efficient forming of the intended part. Moreover, the injection molding processes are usually implemented in mass production so the molds have to withstand thousands and even millions of cycles during their lifespan. Molds for injection molding may be manufactured from various materials. The majority of molds are made of metals, such as steels or aluminum alloys. These metallic molds are generated by a combination of different methods, most of which are subtractive methods, such as Computer Numerical Control (CNC) milling. Subtractive methods are expensive, thus limiting the use of these molds to very large production series.

Less expensive production methods for manufacturing molds for injection molding involve the use of three-dimensional (3D) printing or 3D fabrication processes of thermosetting polymers. However, such molds may exhibit inferior properties relative to metallic molds (e.g., shorter life cycle of the mold) and inferior properties of the final product (e.g., dimensional distortions or geometrical inaccuracies).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
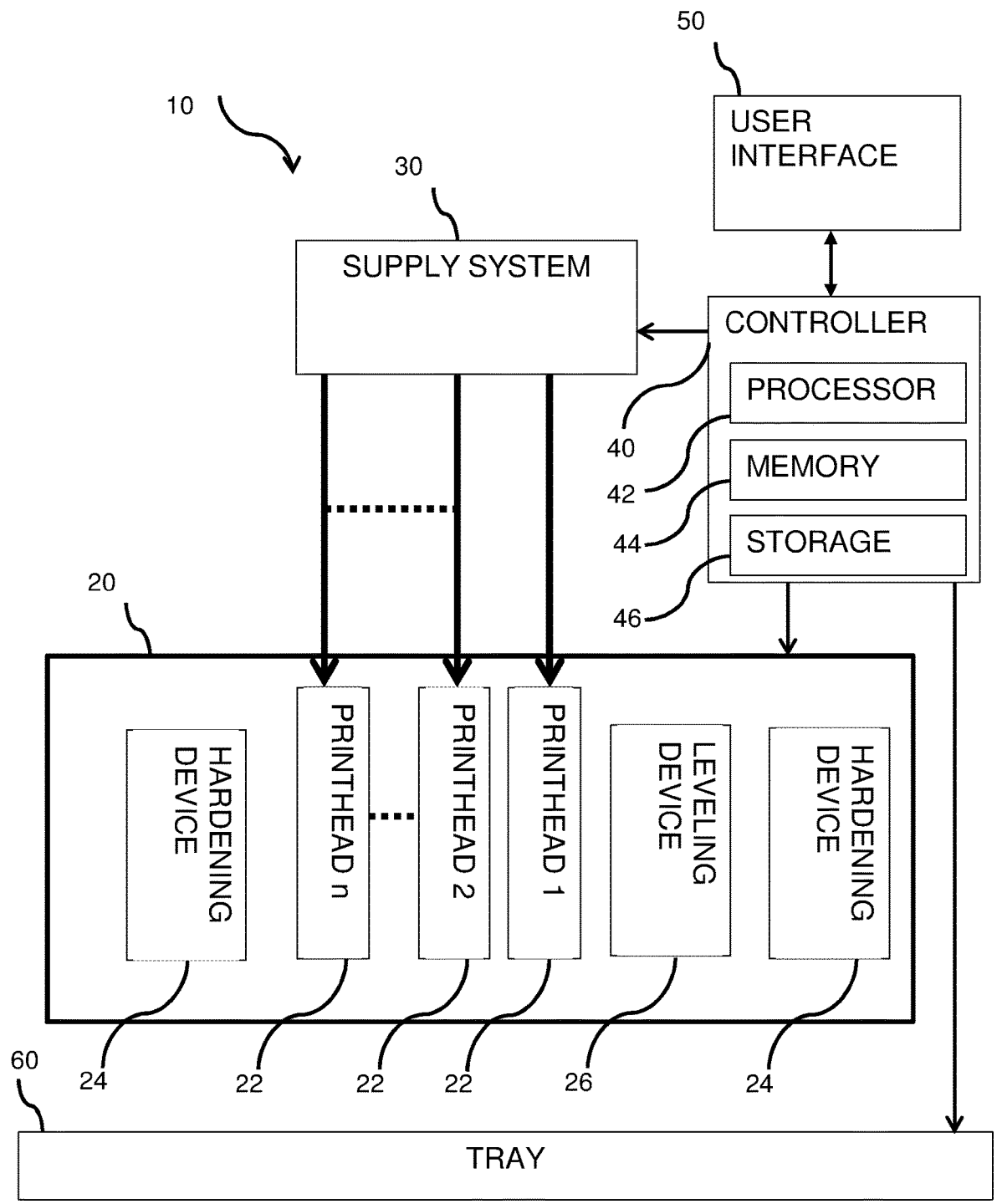
FIG. 1 is a high level block diagram of a printing system according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the invention may be directed to manufacturing molds for injection molding using additive manufacturing (AM) systems, for example a three-dimensional ink-jet printing system. Although embodiments of the invention will be described for ease of explanation with respect to selective deposition modeling (SDM), solid freeform fabrication (SFF) or 3D printing, it should be realized that the invention is not limited to such systems and may be utilized in other AM systems.

During injection molding, the molds are exposed to elevated temperatures, high pressure and stress. Accordingly, such molds may be required to have good mechanical properties, high surface quality and thermal stability at elevated temperatures. For example, in some injection molding processes, a molten polymer may be injected to the mold at high pressure of about 400-1600 Bar, clamping pressure of about 20-80 ton and at a temperature of about 220° C., causing the mold itself to be held at high closure pressure. After injection, upon opening of the mold, high tensile stress may be applied on the mold regions that are adjacent to the injected part.

Molds according to some embodiments of the invention may include two different thermosetting or UV cured polymers to improve the ability of the mold to endure the high temperature and stresses involve in injection molding while maintaining dimensional accuracy during the material deposition process necessary for the fabrication of the mold. A mold according to some embodiments of the invention may include a first portion or region that includes a first material having a glass transition temperature (Tg) or heat deflection temperature (HDT) lower than about 80° C., for example, lower than about 70° C., 60° C. or 55° C. and a second portion or region, that includes a second material having a Tg or HDT higher than about 80° C., for example, higher than about 90° C. Polymers produced by UV curing during an additive manufacturing process, with a Tg or HDT lower than about 80° C. may permit good or acceptable dimensional accuracy, thus an object manufactured from these polymers may have an accurate dimensions after the deposition process.

Heat deflection temperature (HDT) is the temperature at which a material, for example a polymer or plastic sample is bent under a specified load. The HDT of a specific polymer is determined by a standard test outlined in ASTM D648. In the test the specimen is loaded in three-point bending in the edgewise direction at various temperatures increasing at 2° C./min. The outer fiber stress used for testing is either 0.455 MPa or 1.82 MPa. The specimen is loaded and the temperature increases until the specimen deflects by 0.25 mm. Glass transition temperature is the reversible transition in amorphous materials (such as polymers) from a hard and optionally brittle state into a softened or elastic state. Tg may be measured according to ASTM D4065, as E" (loss modulus) Peak temperature.

Some materials according to the invention may have about the same Tg and HDT. For example, a material having a Tg of 60° C. may have an HDT of about 55° C., and a material having a Tg of 90° C. may have an HDT of about 85° C.

The major part of the mold's volume may be additively manufactured using the first material having a Tg and/or HDT lower than about 80° C., for example, lower than about 70° C., 60° C. or 55° C. The first material may be a single building material or a composite material. The first material may be deposited in order to obtain dimensionally accurate geometries. However, materials having Tg and/or HDT lower than about 80° C. may deform if exposed to the high temperatures during the injection of a molten polymer to the mold. For example, the first material may have Tg and/or HDT of about 40-60° C.

A second material having a Tg and/or higher than about 80° C., (e.g., higher than about 90° C.) may be deposited on top and/or adjacent to the first material. The second material may have smaller thickness and may occupy a smaller volume of the mold than the first material. Such a material if used as a single building material (modeling material), for example in an Objet® Eden500™ 3D printer, if deposited at high thicknesses (e.g., higher than 5 mm) may result in a dimensional distortion of more than 3 mm. However, since the second material may be deposited such that the first material forms the base for the second material, the dimensional accuracy of the various elements deposited may be maintained and the dimensional distortion may be less than 3 mm, for example, less than about 1 mm. The second material may have much better thermal stability at the injection molding temperature, thus the mold region covered by the second material may be exposed to a high temperature material being injected into the mold without significant geometrical deformations or distortions.

As used herein, a material may be considered as having a good dimensional accuracy during the additive manufacturing process if the dimensional distortion of a deposited part having dimensions of 500 mm×400 mm×200 mm is less than 3 mm (e.g., less than about 1 mm) in any direction. The first polymer may be a first thermosetting or UV cured polymer; i.e., the first polymer results from the UV initiated polymerizations of compositions deposited to form the first region. For example a typical resin composition for use in Objet Eden500 3D printers may include functional monomers or oligomers.

The resin composition may include, for example, acrylic monomers and/or acrylic oligomers. An acrylic monomer is a functional acrylated molecule which may be, for example, esters of acrylic acid and methacrylic acid. Momoners may be mono-functional or multi-functional (for example, di-, tri-, tetra-functional, and others). An example of an acrylic mono-functional monomer for the present invention is phenoxyethyl acrylate, marketed by Sartomer under the trade name SR-339. An example of an acrylic di-functional monomer is propoxylated (2) neopentyl glycol diacrylate, marketed by Sartomer under the trade name SR-9003. An acrylic oligomer is a functional acrylated molecule which may be, for example, polyesters of acrylic acid and methacrylic acid. Other examples of acrylic oligomers are the classes of urethane acrylates and urethane methacrylates. Urethane-acrylates are manufactured from aliphatic or aromatic or cycloaliphatic diisocyanates or polyisocyanates and hydroxyl-containing acrylic acid esters. An example is a urethane-acrylate oligomer marketed by Cognis under the trade name Photomer-6010.

As used herein high-functional or multi-functional monomers or oligomers are monomers or oligomers having more than one (e.g., di-, tri-, tetra-functional, and others) reactive groups such that when included in a polymer may enhance crosslinking during the hardening process (e.g., curing). The higher the crosslinking degree, the higher the Tg of the polymer. Another property of the monomers or oligomers that may affect the Tg of the polymer is the rigidity of the molecule. The higher the rigidity of the molecule, the higher the Tg.

The mold may further include a second portion, that includes a second material having a Tg and/or HDT higher than about 80° C. The second portion including the second material having a Tg and/or HDT higher than about 80° C. may be deposited on top of the first portion and/or horizontally adjacent to the first portion, and/or optionally covers the first portion. In some embodiments, the second portion region of the mold that is expected to be exposed to the high temperatures and stresses. After deposition, the second portion may have a dimensional distortion of less than 0.5 mm. The second material may be a second thermosetting or UV cured polymer. The second polymer may be fabricated using a composition of monomers or oligomers that when homopolymerized result in a polymer with high Tg (e.g., higher than 100° C.), said monomer or oligomers being for example in a concentration of at least 45% (by weight, i.e. w/w). As used herein, all composition percentages are by weight from the total composition The composition for the second material may include, for example, at least 45% of multi-functional monomers and/or multi-functional oligomers. An exemplary acrylic di-functional monomer is propoxylated (2) neopentyl glycol diacrylate, marketed by Sartomer under the trade name SR-9003.

Reference is now made to FIG. 1, illustrating a high-level block diagram of an exemplary 3D printing system. The 3D printing system may be used to manufacture injection molding molds according to some embodiments of the invention. A system 10 may include a printing unit or printing block 20, a supply system 30, one or more controllers 40, a user interface 50 and a fabrication platform or a tray 60. Controller or controllers 40 may be configured to control all the other elements of system 10.

Printing unit 20 may include one or more print heads 22, for example, print heads 1-$n$ illustrated, one or more hardening, solidifying or curing devices 24, for example, two devices 24 illustrated and one or more leveling devices 26. Print heads 22 may be configured to deposit material using any ink-jet method. Printing unit 20 may move horizontally in both the X and Y directions and/or vertically in the Z direction.

Print heads 22 may include an array of two or more nozzles arranged, for example, in a single line or in a 2D array. Print heads 22 may deposit different materials, For example, print heads 1 and 2 may be configured to deposit a first material having a Tg and/or an HDT lower than about 80° C. or HDT lower than 60° C. and print heads 3 and 4 may be configured to deposit a second material having a Tg and/or an HDT higher than about 80° C. (higher than 80° C. or higher than 100° C.). In some embodiments, other print heads may deposit support material configured to provide support for elements in the mold that need to be supported during the building/manufacturing process of the mold, e.g. overhangs, hollows, etc. Print heads 22 may be fed with the deposition materials from supply system 30. Hardening device 24 may include any device configured to emit light, heat or the like that may cause the deposited material to hardened. For example, hardening device 24 may include one or more UV lamps for curing a UV-curable deposited material. Leveling device 26 may include any device configured to level and/or establish a desired thickness of the newly formed layer by sweeping over the layer and removing excess material. For example, leveling device 26 may be a roller. Leveling device 24 may include a waste collection device (not illustrated) for collecting the excess material generated during leveling.

Supply system 30 may include two or more material containers or cartridges configured to provide a plurality of building materials to print heads 22. In some embodiments, each of the first, second, third etc. building materials may be deposited to form a different portion of the mold. Alternatively, two or more building materials from different containers included in supply system 30 may be deposited each from a different print head 22, adjacent to each other on the printing surface/tray where they may overlap but not mix, i.e. each building material retaining its individual properties, to form a heterogeneous first material after deposition. A similar process may be implemented with respect to the second material, when the second material includes a similar 'combination' of one or more building materials deposited together to form a heterogeneous second material. The deposition process of the two or more building materials and other aspects of the material supply from supplying system 30 to print heads 22 may be controlled by controller 40.

Each or the one or more controllers 40 may include a processor 42 that may be, for example, a central processing unit processor (CPU), a chip or any suitable computing or computational device, a memory 44 and storage unit 46. For example, processor 42 may control the movement of printing unit 20 at a desired direction. Memory 44 may include for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 44 may be or may include a plurality of, possibly different memory units.

The one or more Memories 44 may include an executable code, e.g., an application, a program, a process, task or script. The executable codes may include codes or instructions for controlling apparatus 10 to print 3D objects according to embodiments of the present invention. For example, memory 44 may include a code for depositing a first building material at a first portion of the 3D object (e.g., molds), using for example, a first set of print heads 22, and hardening the material in the first portion, using for example, hardening device 24. The code may further include depositing a second building material in a second portion of the mold, on top of the first portion and/or adjacent to it.

Storage unit 46 may store files that include design parameters of the 3D molds to be manufactured/built/fabricated by apparatus 10. For example, 3D computer aided design (CAD) files that include the design of the 3D molds may be stored in storage unit 46. The files may include the dimensions and locations of different portions of the mold.

Apparatus 10 may further include user interface 50. User interface 50 may be or may include input devices such as a mouse, a keyboard, a touch screen or pad or any suitable input device. It will be recognized that any suitable number of input devices may be included in user interface 50. User interface 50 may further include output devices such as: one or more displays, speakers and/or any other suitable output devices. It will be recognized that any suitable number of output devices may be included in user interface 50. Any applicable input/output (I/O) devices may be connected to controller 40 as shown by block 50. For example, a wired or wireless network interface card (NIC), a modem, printer or facsimile machine, a universal serial bus (USB) device or external hard drive may be included in user interface 50. User interface 50 may allow a user to upload and/and instructions for controlling deposition of molds according to some embodiments of the invention and/or to upload and update files comprising the design of the deposited molds (e.g., computer aided design (CAD) files) into storage unit 46.

Tray 60 may be any tray that is suitable to support, i.e. bear the ink-jet printing or other additive manufacturing of 3D objects. Tray 60 may be attached or connected to an X-Y table and may be controlled, e.g., by controller 40, to move in the Z direction according to the requirements of the printing or deposition process. Additionally or alternatively tray 60 may be configured to move in the X-Y plane.

Controller 40 may control printing unit 20 and/or tray 60 to cause a relative movement between printing unit 20 and tray 60 or the portion(s) of the object already deposited on the tray, such that each of print heads 22 may deposit droplets of building material (e.g., first or second building materials) at a predetermined location in the X-Y plane and at a predetermined height at the Z direction.

Figure 2:
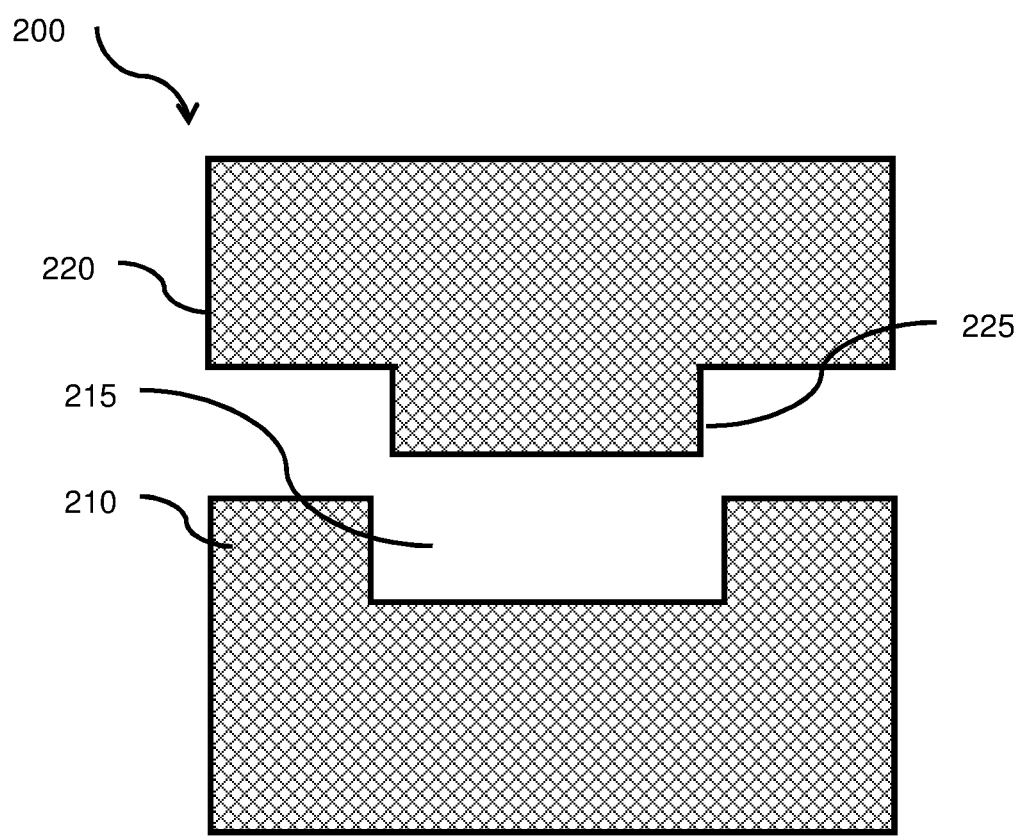
FIG. 2 is an illustration of a mold manufactured according to some embodiments of the invention.

Reference is made to FIG. 2, which is an illustration of an exemplary mold according to some embodiments of the invention. A mold 200 may include a first part 210 and a second counter-part 220. First part 210 may include a cavity 215 and second part 220 may include a protrusion 225. Upon attaching parts 210 and 220 a confined space is formed. The shape of the space corresponds to the shape of products that are manufactured using the mold. Molten polymer may be injected into this space and allowed to at least partially solidify in the mold to form the final product. Cavity 215 and protrusion 225 may be exposed to elevated temperatures of about 150-330° C. and high pressure of about 400-1600 Bar during the injection molding process. Each of parts 210 and 220 may be manufactured from thermosetting or UV-cured polymers using 3D printing methods.

FIGS. 3-6 illustrate exemplary mold parts having a cavity according to some embodiments of the invention. An exemplary mold part 310 is illustrated in FIG. 3A. Mold part 310 may include a cavity 315, a first portion 312 and a second portion 314. First portion 312 may be deposited (e.g., by ink-jet printing) layer by layer using a first material (e.g., a material that after curing forms a thermosetting or UV-cured polymer) having a glass transition temperature (Tg) and/or an HDT lower than about 80° C., for example, lower than about 70° C., 60° C. or 55° C. or in the range of 40-60° C. This material may exhibit good dimensional accuracy during the deposition. First portion 312 may occupy most of the volume of mold part 310. An exemplary first material, according to some embodiments of the invention, may have a Tg and/or HDT of about 48° C. and a modulus of elasticity of about 2-2.5 GPa. The first material may be the result of the UV initiated polymerization of a first building material composition. Said first composition may include a curable component, having a functional group (e.g., the curable component may include functional monomers and/or oligomers), a photo-initiator, a surface-active agent and a stabilizer. The curable component may be a (meth)acrylic monomer, a (meth)acrylic oligomer, a (meth)acrylic cross-linker, or any combination thereof. The first composition may include curable components having 50-80% of mono-functional monomers and/or oligomers and/or 0-50% of multi-functional monomers and/or oligomers.

Second portion 314 may be produced by depositing a second building material composition. Said composition when polymerized having a Tg and/or an HDT higher than about 80° C., for example, higher than about 90° C. or in the range of 85-100° C. The second portion may formed at places in mold part 310 that may be exposed to elevated temperatures of about 150-330° C. and high pressure of about 400-1600 Bar, for example, places facing cavity 315. Second portion 314 may cover first portion 312 such that the attachment between the first and second portions may have strength at an amount that may prevent distortion of the deposited material of second portion 314 during the deposition process. First portion 312 may dimensionally support second portion 314, to prevent dimensional distortions larger than 1 mm. Second portion 314 may have a thickness of 1-5 mm.

The second composition may include a curable component, having a multi-functional group (e.g., the curable component may include multi-functional monomers and/or oligomers), a photo-initiator, a surface-active agent and a stabilizer. The curable component may be a (meth)acrylic monomer, a (meth)acrylic oligomer, a (meth)acrylic cross-linker, or any combination thereof. An exemplary second composition may include at least 45% of multi-functional monomers and/or oligomers. The second composition may include at least 45% of components that if homopolymerized result in polymers with high Tg, such as multi-functional acrylates with high Tg (above ~100° C.) and/or monomers or oligomers having rigid molecules, for example, commercially marketed by Sartomer as SR833s, SR834, CN968, CN975, SR368, SR295, SR9041 and others.

Figure 3A:
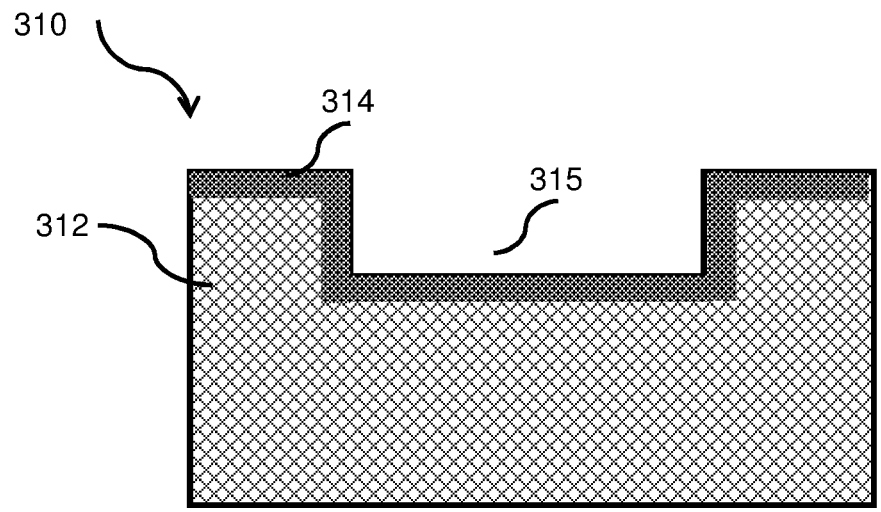
FIG. 3A is an illustration of an exemplary mold according to some embodiments of the invention.
Figure 3B:
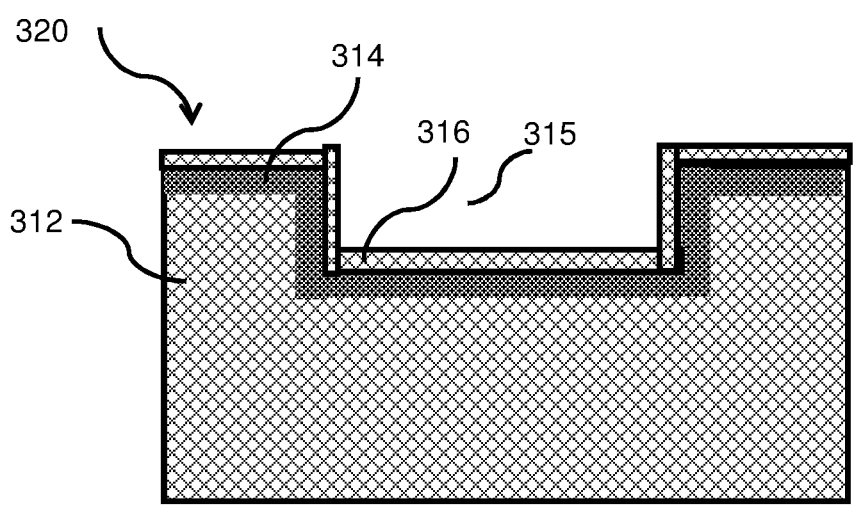
FIG. 3B is an illustration of another exemplary mold according to some embodiments of the invention.

In some embodiments, an additional third portion may cover the first portion. The third portion may include the first material or other material having a Tg and/or an HDT lower than about 80° C. The third portion may protect the second portion from cracks and brittleness. A mold part 320 that includes a third portion is illustrated in FIG. 3B. Mold part 320 may include substantially the same portions and material as mold part 310. Mold part 320 may further include a third portion 316. Third portion 316 may be deposited using the same first composition as first portion 312 or may be deposited using another composition (e.g., a material that after hardening or polymerizations results in a polymer material having a Tg and/or an HDT lower than about 80° C. Such material may have higher ductility than the second material having a Tg and/or an HDT higher than about 80° C. The third portion may cover the second portion and may further have a thickness of about 0.05-0.5 mm, for example, 0.3 mm.

Figure 4:
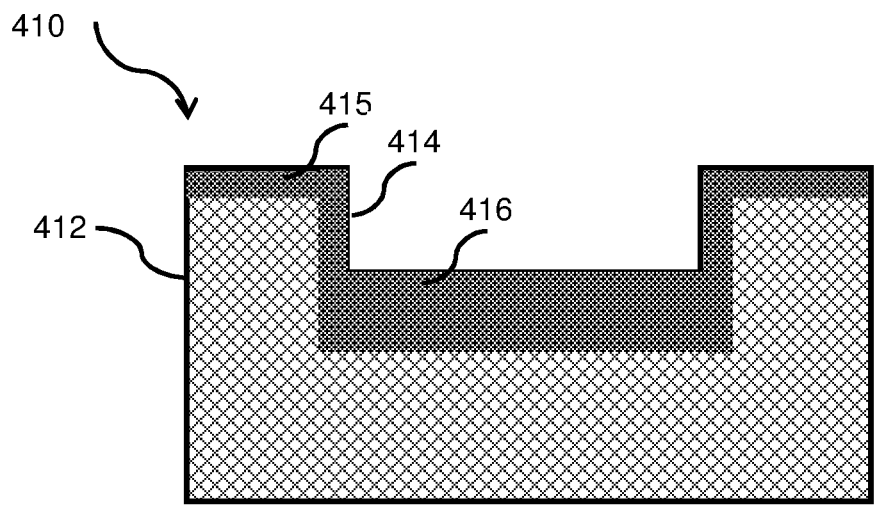
FIG. 4 is an illustration of another exemplary mold according to some embodiments of the invention.

Another exemplary mold part 410 is illustrated in FIG. 4. Mold part 410 may include a first portion 412 and a second portion 414 comprising two sub-portions, a thinner sub-portion 415 and a thicker sub-portion 416. First portion 412 may be deposited using the first material (e.g., a material that after hardening forms a polymer) having a glass transition temperature (Tg) and/or an HDT lower than about 80° C., for example, lower than about 70° C., 60° C. or 55° C. First portion 412 may occupy most of volume of mold part 410.

Second portion 414 may be deposited using the second material having a Tg and/or an HDT higher than about 80° C., for example, higher than about 90° C. The second portion may be deposited at places in mold part 410 that may face elevated temperatures of about 150-330° C. and high pressure, of about 400-1600 Bar. Second portion 414 may include a thinner sub-portion 415 having, for example, a thickness of 1-5 mm, deposited to cover and protect first portion 412. Second portion 414 may further include a thicker sub-portion 416 deposited at places that may face the molten polymer injected into the mold, e.g., to the cavity of the mold, thus may require a higher resistance to elevated temperatures and pressures. The thickness of sub-portion 416 may be, for example, 6-10 mm.

Figure 5:
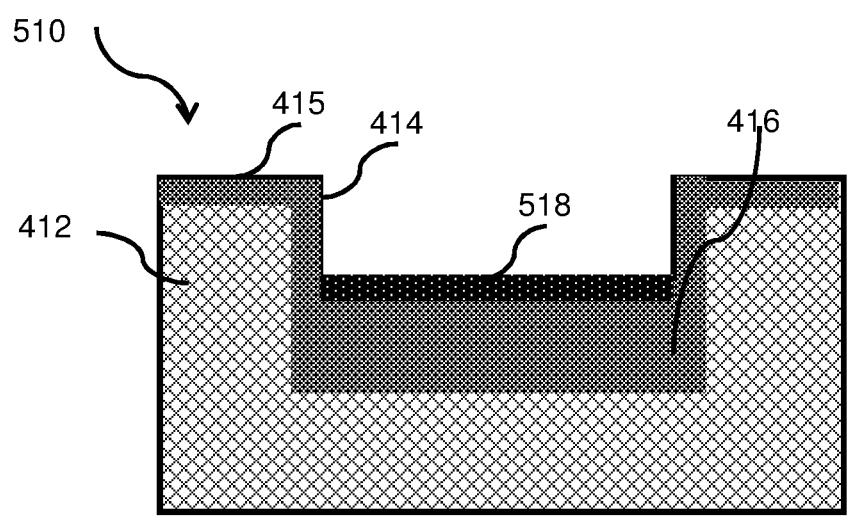
FIG. 5 is an illustration of another exemplary mold according to some embodiments of the invention.

In some embodiments, additional resistance and durability may be required at desired locations in the mold part, for example, in the entire cavity or in some distinct locations within the cavity. This location may be determined by a computer simulation of the injection and solidification process in the mold. The desired location may be included in the second portion, but may be further coated by a third material having a Tg or a HDT higher than the Tg or the HDT of the polymer included in the second portion, for example, a Tg and/or an HDT higher than about 100° C. An exemplary mold part having a fourth portion deposited at desired locations is illustrated in FIG. 5. Mold part 510 may include substantially the same portions of mold 410. However, in some desired locations mold part 510 may include at least a fourth portion 518 deposited to cover desired locations in second portion 414 that are exposed to a higher temperature of about 150-330° C. The thickness of fourth portion 518 may be 0.05-0.5 mm.

The composition which when hardened or polymerized forms the third material may include a curable component, having a multi-functional group (e.g., the curable component may include multi-functional monomers and/or oligomers), a photo-initiator, a surface-active agent and a stabilizer. An exemplary composition may include between 40-80% of multi-functional monomers and/or oligomers. The composition may include curable component having 0-50% of mono-functional monomers and/or 40-80% of multi-functional oligomers. In some embodiments, the first portion may be constructed from a material other than a polymer, for example, a metal or a metal alloy such as aluminum alloy, steel or the like, or a ceramic material such as fused silica, alumina or the like. This first portion may be constructed to be reused as the base of various different molds. The first portion may be prefabricated e.g. not by additive manufacturing and the cavity detail subsequently added by additive manufacturing. For example, the first portion may have a general cavity configuration and the detailed elements of the mold may be deposited using a material that after hardening forms a thermosetting or UV-cured polymer according to a desired design. The deposited second portion of the mold part may be deposited using a material having a Tg and/or an HDT higher than about 80° C., for example, higher than 90° C. In order to avoid dimensional distortions in the second deposited portion very good adhesion must be established between the first portion and the deposited second portion. Such adhesion may be established by creating a zone comprising a special glue, between the first and second portions or by welding a net to the surface of the first portion facing the second portion or changing roughness of the surface. The deposited portion may be connected to the first portion with sufficient adhesion force as to avoid any disconnection of the deposited portion from the metallic portion during the deposition process of the deposited second portion, and further also during the injection molding process.

Figure 6:
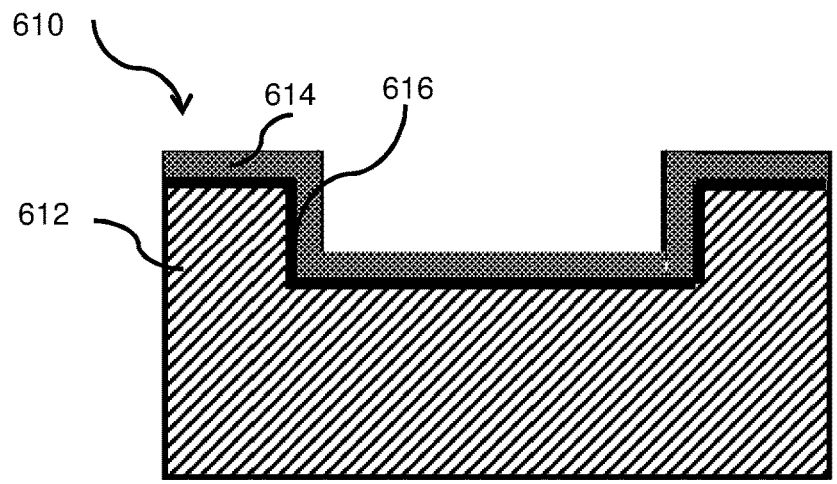
FIG. 6 is an illustration of another exemplary mold according to some embodiments of the invention.

Reference is now made to FIG. 6 that illustrates an exemplary mold part according to some embodiments of the invention. A mold part 610 may include a first portion 612, a second deposited portion 614 and an adhesion zone 616 that connects portion 614 to portion 612. First portion 612 may include any material that has a module of elasticity higher than 2.5 GPa. The first portions may include metal or metal alloy suitable for forming a mold for injection molding, for example, an aluminum alloy or steel. Portion 612 may be shaped into a desired form by any known method, for example, machining. Portion 612 may be shaped into a general mold shape that may be used as a basis for depositing second portion 614. Portion 612 may conduct away heat from portion 614 during the injection molding process. Portion 614 may be deposited, using for example, ink-jet printing methods on top of or adjacent to first portion 612. In some embodiments, the details of the object to be injection molded may be contour deposited in portion 614. The fabrication flexibility of 3D deposition methods may allow manufacturing detailed molds in a short time and at low costs. Portion 614 may be deposited inside the cavity of mold part 610 facing the molten polymer injected to the mold. Portion 614 may be deposited using a composition that after hardening forms a thermosetting or UV-cured polymer having a Tg and/or an HDT higher than about 80° C. (e.g., higher than 90° C.), for example, a polymer having at least 45% of multi-functional monomers and/or multi-functional oligomers. Portion 614 may be deposited using a polymer having at least 45% monomers and/oligomers having a Tg and/or an HDT higher than about 100° C.

To achieve dimensional accuracy during the deposition of portion 614, good adhesion should be obtained between first portion 612 and second deposited portion 614, such that the first portion may support and stabilize the deposited layers during deposition. Such adhesion may be established using several adhesion methods, e.g., by forming an adhesion zone 616 between portion 612 and portion 614. Adhesion zone 612 may include a glue to enhance adhesion between portion 612 and a deposited polymer. The glue may be deposited prior to the deposition of second portion 614. Adhesion zone 612 may include a metallic net welded to the surface of portion 612 that may be in contact with deposited portion 614, such that the contact surface metal/polymer may be increased, increasing the adhesion between the two portions. Additionally or alternatively, an artificial surface roughness may be introduced into the surface of portion 612 by, for example, creating abrasion in the surface, thus increasing the contact surface area between the deposited polymer and the metallic or ceramic portion.

In some embodiments, an additional third portion (not illustrated) may be deposited to cover the second portion. The third portion (for example, portion 316 illustrated in FIG. 3B) may be deposited using a material composition that after hardening forms a thermosetting or UV-cured polymer having a Tg and/or an HDT lower than about 80° C., for example, lower than about 60° C. or 55° C. or in the range of 40–60° C. Such material may have higher ductility than the material having a Tg and/or an HDT higher than about 80° C. The third portion may cover the second portion and may further have a thickness about 0.3 mm, for example, 0.05-0.5 mm.

Figure 7:
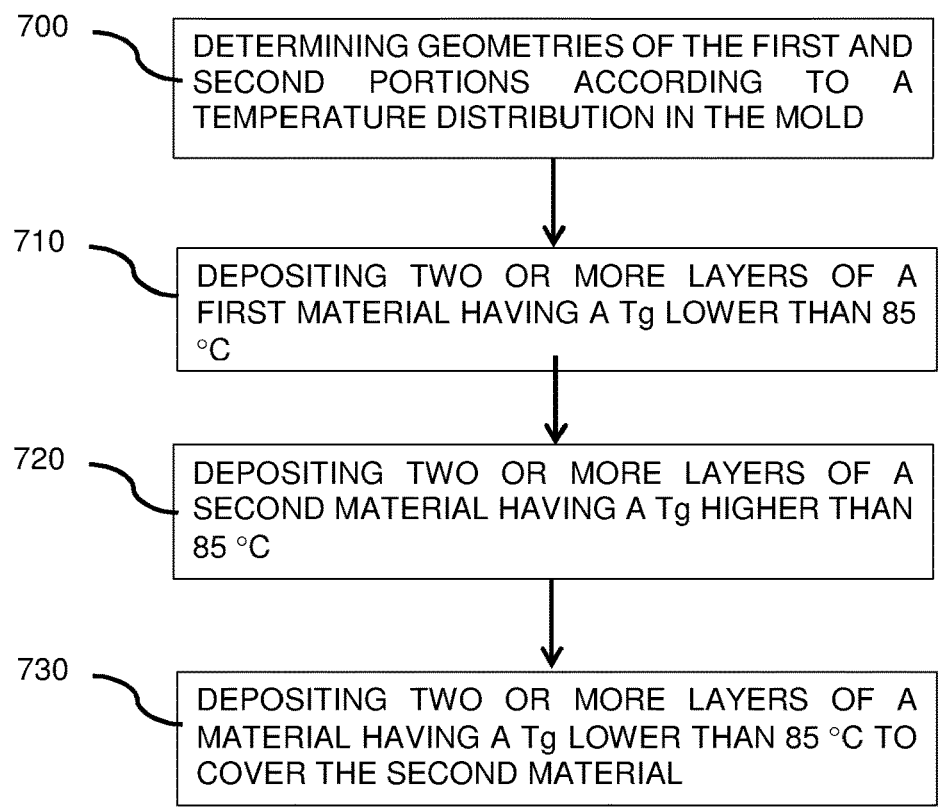
FIG. 7 is a flowchart of a method of manufacturing molds according to some embodiments of the invention.

Reference is made to FIG. 7 that presents a flowchart of a method of manufacturing molds according to some embodiments of the invention. In box 700, the method may include determining geometries of first and second portions (e.g., portions 312-314 or 412-414) according to a temperature distribution in the mold during the injection molding. The first portion may include a first material having a Tg and/or an HDT lower than about 80° C., for example, lower than about 70° C., 60° C. or 55° C. or in the range of 40-60° C. and the second portion may include a second material having Tg and/or an HDT higher than about 80° C., for example, higher than about 90° C. or in the range of 85-100° C. A computer simulation of expected temperatures during an injection molding may be conducted using a 3D model of the mold. The simulated temperature distribution may be the basis for determining in which portions of the mold the second material must be deposited, for example, at portion(s) of the mold facing the higher temperatures (e.g., higher than 150° C.). The simulated temperature distribution may further determine in which portions of the mold the first material can be deposited, for example at portion(s) of the mold facing the medium-low temperatures (e.g., 40-150° C.).

In some embodiments, the second portion may be thicker at areas of higher expected temperature. For example, a thicker sub-portion 416 may be deposited at the middle part of the mold's core as illustrated in FIG. 4. In some embodiments, the method may include determining the geometry and shape of a third portion (e.g., portion 316) that includes the first material (or any other material having a Tg and/or an HDT lower than about 80° C., for example, lower than 70° C. or in the range of 40-60° C.). The third portion may be much thinner than the first and second portions and may cover the second portion, for example 0.05-0.5 mm.

The determined geometries of the first and second (and optionally also the third) portions may be saved (e.g., as a CAD files) in a storage medium associated a deposition apparatus for preparing 3D models or objects, for example, storage 46 included in ink-jet apparatus 10. The stored portions may be used to further determine a deposition sequence of the first and second or more building materials in each layer deposited by the deposition apparatus.

In some embodiments, the deposition sequence may include depositing a support material, for supporting specific elements of the deposited mold.

Operations 710, 720 and 730 may be conducted by ink-jet printing, using for example, system 10 illustrated in FIG. 1. Alternatively, the operations may be conducted using any deposition/printing process that may allow preparing 3D objects by depositing building materials layer by layer.

In box 710, the method may include depositing two or more layers of a first material having a glass transition temperature (Tg) and/or an HDT lower than about 80° C., for example, lower than about 70° C., 60° C. or 55° C. or in the range of 40-60° C., forming the first portion (e.g., portions 312 and 412) of the mold. The first material may be deposited layer by layer to form the first portion of the mold. In some embodiments, in a single scan of the printing unit (e.g., printing unit 20) only the first material may be deposited in a single layer, where the entire cross section of the mold scanned is included in the first portion, for example, the lower ends of the first portions of molds 310, 410 and 510.

In box 720, the method may include depositing two or more layers of a second material having a Tg and/or an HDT higher than about 80° C., for example, higher than 90° C. or in the range of 85-100° C., forming the second portion (e.g., portion 314 and 414) of the mold. The second material may be deposited layer by layer to form the second portion of the mold. The second material may be formed of a composition that after hardening may results in a thermosetting or UV-cured polymer, comprising at least 45% of monomers or oligomers and having Tg higher than 100° C. and/or at least 45% of multi-functional monomers or oligomers.

In some embodiments, the method may include depositing an additional high Tg material having for example a Tg and/or an HDT higher than about 100° C. to cover at least parts of the second portion at locations in the mold that may be exposed to extremely high temperature, for example, above 300° C. during the injection molding process. An additional portion (e.g., portion 518) may be deposited at areas and locations in the mold that require better thermal stability during the injection molding process.

In some embodiments, in a single scan of the printing unit (e.g., printing unit 20) both the first material and the second material may be deposited simultaneously to form a single layer, where the cross section of the mold scanned includes both the first portion and the second portion, for example, the middle sections of mold parts 310, 410 and 510. In some embodiments, only the second material may be deposited during a single scan in a single layer, for example, at the upper ends of mold parts 310, 410 and 510. In some embodiments, three or more different materials may be deposited in a single layer during a single scan of the printing unit. For example, a first material, a second material, optionally a third material, and a support material may be deposited to form shapes in the core of the mold parts.

In box 730, the method may include depositing two or more layers of a material having Tg and/or an HDT lower than about 80° C., for example, lower than 60° C. or 55° C., forming a third portion (e.g., portion 316) of the mold to cover the second portion. The third portion may be deposited using the first material or any other material having Tg and/or an HDT lower than about 80° C. The third portion may be deposited having a thickness of 0.1-0.3 mm.

Figure 8:
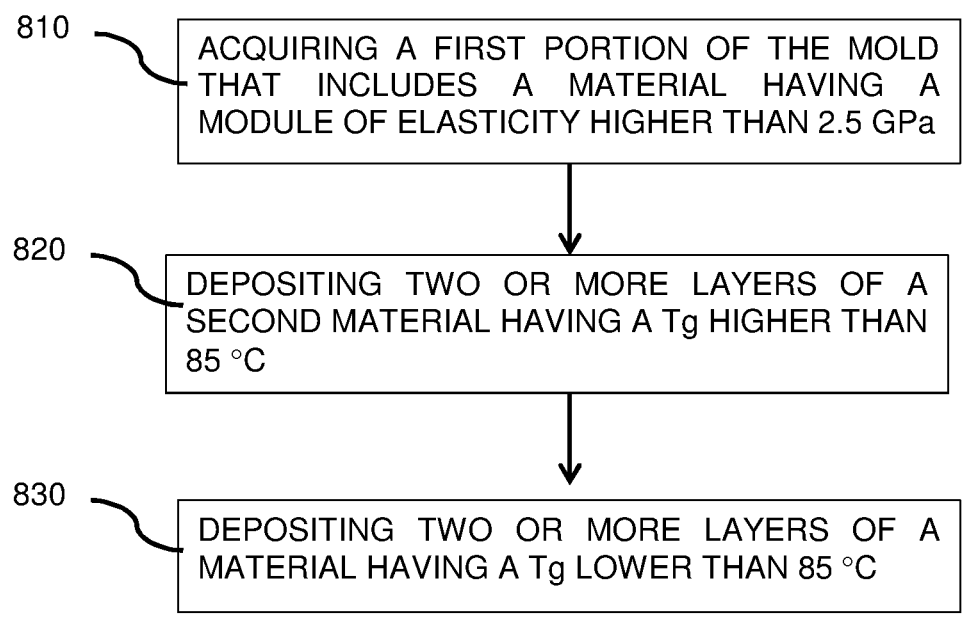
FIG. 8 is a flowchart of a method of manufacturing a mold according to some embodiments of the invention.

Reference is made to FIG. 8 that presents a flowchart of a method of manufacturing a mold (e.g., mold part 610) according to some embodiments of the invention. In box 810 the method may include acquiring a first portion (e.g., portion 612) of the mold that includes a material having module of elasticity higher than 2.5 GPa. The first portion may include metals, such as steels or aluminum alloys, ceramic material, such as alumina, a composite material or any other material having module of elasticity higher than 2.5 GPa. The first portion may be manufactured to have a standard shape that may be used and re-used for preparing various molds.

In box 820, the method may include depositing on top of the first portion two or more layers of a polymeric material having a glass transition temperature (Tg) and/or an HDT higher than about 80° C., for example, higher than 90° C., forming a second portion of the mold (e.g., portion 614). The second material may be deposited layer by layer to form the second portion of the mold. In some embodiments, the thickness of the second portion is larger than 1 mm.

In some embodiments, an adhesion zone (e.g., zone 616) may be obtained to enhance the adhesion between the first and second portions. In some embodiments, the adhesion of the second portion to the first portion is by using glue. In some embodiments, the adhesion of the second portion to the first portion is by welding a metallic net to the surface (e.g., zone 616) of the first portion that forms the interface with the second portion. Additionally or alternatively, the surface of the first portion facing the second portion may be modified by increasing the roughness of the surface (e.g., by adding artificial scratches), to increase the attachment surface area of the material of the second portion to the first portion.

In box 830, the method may include depositing two or more layers of a material having a Tg and/or an HDT lower than about 80° C., for example, 70° C. or in the range of 40–60° C. forming a third portion (e.g., portion 316 illustrated in FIG. 3B) of the mold to cover the second portion. The third portion may be deposited having a thickness of 0.1-0.3 mm. While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of preparing a mold for injection molding, the method comprising:
   acquiring a first portion of the mold that is metal or metal alloy having a modulus of elasticity higher than 2.5 GPa; and
   depositing on top of the first portion, two or more layers of a polymeric second material having a glass transition temperature (Tg) and/or a heat deflection temperature (HDT) higher than 80° C., forming a second portion of the mold, wherein the second material is made of a composition comprising multi-functional monomers and oligomers in a concentration higher than 45% by weight percentage from the total weight of the composition.

2. The method of claim 1, further comprising depositing two or more layers of a material having a Tg lower than 80° C., forming a third portion of the mold to cover the second portion.

3. The method of claim 2, wherein a thickness of the third portion is less than 300 μm.

4. The method of claim 1, further comprising using glue to enhance adhesion of the second portion to the first portion.

5. The method of claim 1, further comprising enhancing adhesion of the second portion to the first portion by welding a metallic net to a surface of the first portion that forms an interface with the second portion.

6. The method of claim 1, wherein the adhesion of the second portion to the first portion is such that a geometrical distortion of the second portion during printing is less than 1 mm.

7. The method of claim 1, wherein the polymeric material forming the second portion has a Tg higher than 80° C.

8. The method of claim 1, wherein the polymeric material forming the second portion has an HDT higher than 80° C.

9. The method of claim 1, wherein the polymeric material forming the second portion has a Tg and/or an HDT higher than 90° C.

10. A mold for injection molding, comprising:
    a first portion of the mold that is metal or metal alloy having a modulus of elasticity higher than 2.5 GPa; and
    a second portion comprising a second material having a glass transition temperature (Tg) and/or a heat deflection temperature (HDT) higher than 80° C., wherein the second material is made of a hardened composition comprising multi-functional monomers and oligomers in a concentration higher than 45% by weight percentage from the total weight of the hardened composition.

11. The mold of claim 10, wherein the second portion at least partially covers the first portion.

12. The mold of claim 10, further comprising a third portion comprising a material having a glass transition temperature (Tg) lower than 80° C., wherein the third portion covers the second portion.

13. The mold of claim 12, wherein a thickness of the third portion is less than 300 μm.

14. The mold of claim 10, wherein the second portion has a thickness of at least 1 mm.

15. The mold of claim 10, wherein the second material is made of a hardened composition comprising monomers and oligomers having a Tg higher than 100° C. in a concentration higher than 45% by weight percentage from the total weight.

16. The mold of claim 10, wherein the second material forming the second portion has a Tg higher than 80° C.

17. The mold of claim 10, wherein the second material forming the second portion has an HDT higher than 80° C.

18. The mold of claim 10, wherein the second material forming the second portion has a Tg and/or an HDT higher than 90° C.

* * * * *